Figure 2:
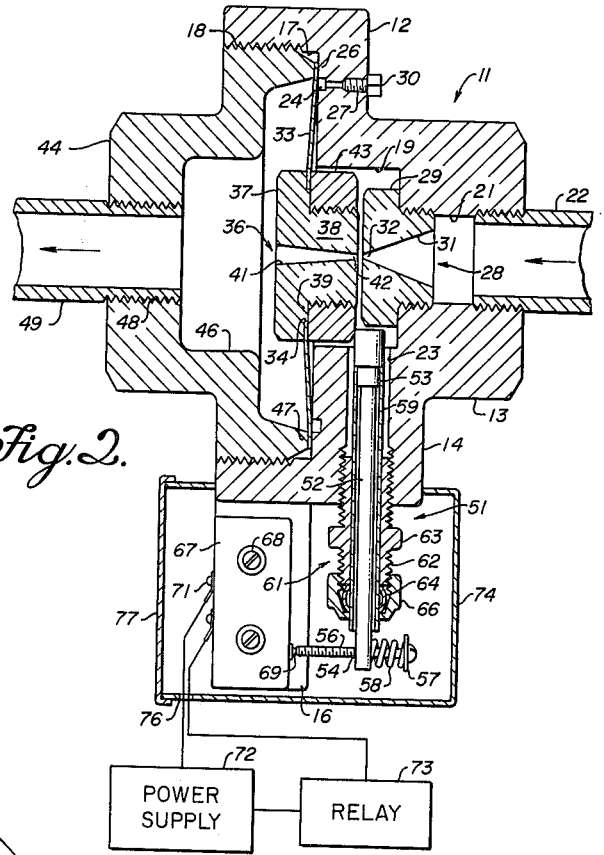

Dec. 28, 1965    L. R. LUCAS ETAL    3,226,505
FLUID FLOW INTERLOCK
Filed Nov. 9, 1962

INVENTORS.
LUTHER R. LUCAS
BY  CLAIRE E. MINER

ATTORNEY.

United States Patent Office  3,226,505
Patented Dec. 28, 1965

3,226,505
FLUID FLOW INTERLOCK
Luther R. Lucas, San Francisco, and Claire E. Miner, Berkeley, Calif., assignors to the United States of America as represented by the United States Atomic Energy Commission
Filed Nov. 9, 1962, Ser. No. 236,751
6 Claims. (Cl. 200—81.9)

The present invention relates to interlocks for fluid flow systems and more particularly to an improved mechanism for providing an alarm, control activation, or automatic shutdown of equipment upon a reduction of fluid flow through a system.

A variety of fluid systems require interlock devices which monitor the flow of fluid through a conduit and which automatically operate a control, alarm or the like upon a significant change in the flow. The coolant systems of charged particle accelerators and nuclear reactors are typical of apparatus requiring such interlocks inasmuch as an undetected flow reduction can result in the overheating of costly equipment.

Prior forms of fluid interlock have not provided optimum reliability, durability, sensitivity or adaptability to low cost manufacture. Notably, such devices are not generally "fail safe" i.e., the interlock may not operate upon a blockage of flow within the interlock itself. On one occasion, for example, seventeen conventional interlocks monitoring a like number of charged particle accelerator coolant channels simultaneously indicated fluid flow when in fact no fluid was flowing in any channel.

A typical conventional flow monitoring device makes use of the Bernoulli effect to establish a pressure differential on opposite sides of a rubber diaphragm. The flow is through an orifice, and the rubber diaphragm, responding to an increasing pressure differential in the fluid on the two sides of the orifice, moves from a first to a second position as the flow of fluid approaches a normal rate. Movement of the diaphragm resulting from an undesirable change in this pressure differential is transmitted through a second diaphragm and operates an electrical switch to provide an alarm or to shut down the equipment. Heretofore, such mechanisms have not been fail safe since clogging of the orifice continues to provide a pressure differential on the first diaphragm which acts in the same direction as when fluid flows.

Prior forms of interlock also tend to have a rather large differential in flow between operate and release points, for example release at 70 percent of operate flow conditions.

In the present invention the fluid flows through a passage in the center of the diaphragm itself, the diaphragm passage being a moveable terminal portion of a transversely split venturi tube and being of larger diameter on the downstream side of the diaphragm than on the upstream side thereof. Thus the pressure acting on the upstream side of the diaphragm is normally lower than that on the downstream side, during fluid flow, being obtained from the split between the two sections of the venturi. This is the reverse of the pressure differential which acts on the diaphragms of conventional mechanisms of this type. This differential in pressure between the two sides of the diaphragm is sufficient to move the diaphragm upstream under full flow conditions. When the incoming flow ceases the pressure equalizes on the two sides of the diaphragm which may then return to the initial position thereby indicating the flow stoppage. In contrast to prior interlocks the invention will respond in a similar manner to clogging within the interlock venturi itself since such clogging will cause pressure on the upstream side of the diaphragm. Either of these changes in pressure on the diaphragm will cause the diaphragm to move in the downstream direction to operate an electrical switch which may readily be arranged to actuate an alarm or automatically shut down the equipment. Owing to the described novel structure the diaphragm movement can be produced by very slight changes in the flow rate.

In addition to the fail-safety consideration, a great amount of difficulty has been experienced with prior interlocks due to hardening of rubber diaphragms and due to permanent set taken by the rubber. These difficulties with the rubber diaphragms become more pronounced where the interlock is used in the presence of radiation. When the rubber diaphragm takes a permanent set a signal indicating that fluid is flowing may be obtained continually regardless of flow conditions. The present invention uses a metallic diaphragm to support the movable venturi portion and therefore has further advantages in that the diaphram is not subject to hardening in the manner of rubber. The diaphragm may take a permanent set if subjected to too much pressure but this is prevented by novel structural features in the invention as will be described hereinafter. The metal diaphragm is more durable and has lower hysteresis losses providing much better reproducibility of critical operating point conditions.

Accordingly, it is an object of this invention to provide a more reliable interlock for detecting changes in the flow rate in a fluid conduit.

Ii is a further object of this invention to provide a fluid flow detector, of the class having a flexible diaphragm responding to a pressure differential established by the flow, in which the diaphragm moves against the flow under normal flow conditions.

It is another object of the invention to provide a fluid flow monitor capable of indicating a flow stoppage arising from clogging within the monitor itself.

Another object of this invention is to provide an interlock device for detecting a flow rate level in a fluid system that will consistently function at the desired flow rate over an extended period of operation.

It is an additional object of the present invention to provide a fluid flow interlock sensitive to a very small change in flow rate.

It is still another object of this invention to porvide a more durable, compact and economically manufactured fluid flow interlock.

Figure 1:
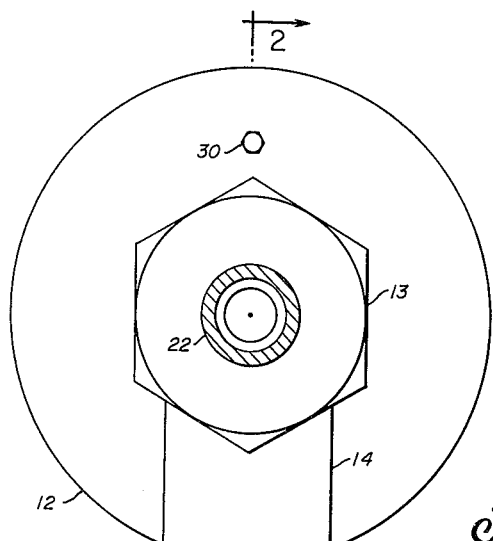
Figure 1:
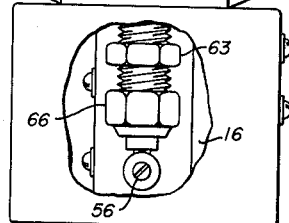

The invention together with further objects and advantages thereof will be best understood by reference to the following specification in conjunction with the accompanying drawing of which:

FIGURE 1 is a partly broken out view of a fluid flow interlock from the input end, and FIGURE 2 is a section view taken along line 2—2 of FIGURE 1.

Referring now to the drawing, the apparatus has a housing formed of a metal body member 11 which is of a generally cylindrical shape typically having an overall length of about two thirds of the diameter. Body 11 may be formed with a cylindrical portion 12 and an integral projecting hexagonal section 13 coaxial therewith and having a minor diameter about one half the diameter thereof. The lengths of the two sections 12 and 13 may be about equal. Adjacent to cylindrical portion 12 and extending a little below the outer radius of the cylindrical portion at its lower edge is a rectangular boss 14 formed as an integral element of portion 12. A rectangular arm 16 projects downwardly from the flat lower face of boss 14 at one corner thereof for purposes to be hereinafter discussed.

A broad axial bore 17 is formed in the flat end face of body cylindrical portion 12 to a depth of about two thirds of the axial length of the cylindrical portion. Bore 17 is provided with threading 18. A second bore 19 forms a coaxial continuation of bore 17 and has a diameter about four tenths thereof. The axial length of bore 19 is about the same as that for bore 17. A third coaxial bore 21 extends on through the hexagonal body section 13. Bore 21 is threaded at the inner end and threading at the outer end provides for connecting a fluid flow input conduit 22 to the interlock.

Further elements of body member 11 include a small vertical radial bore 23 extending through boss 14 and communicating with bore 19 near the inner end thereof. The diameter of bore 23 is preferably about half the depth of bore 19 and the outer portion of bore 23 is threaded to provide for a pipe fitting which will be described later. An annular groove 24 is provided in the end surface of bore 17 leaving a fairly narrow annular shoulder 26 between the groove and the circular wall of the bore. An additional bore 27 through the end surface of body member 12, adjacent to hexagonal section 13, connects to annular groove 24 and is threaded to receive a plug 30 or a connection with means for flushing out the device as may be required.

To provide the stationary half of a transversely split venturi, an annular nozzle 28 is threadably engaged in bore 21, the nozzle having an enlarged hexagonal head 29 projecting a small distance into the adjacent bore 19. A conical bore 31 which may taper at an angle of 40 degrees for example, is formed coaxially in the nozzle 28 with the narrow end of the bore at the hexagonal head 29. Bore 31 thus forms a small orifice 32, typically about three thirty-seconds of an inch diameter at the inner end of nozzle 28, with the sloping sides of bore 31 acting to direct the fluid flow thereto.

A circular metallic resilient diaphragm 33 is accurately formed to fit on the shoulder 26 of bore 17, the diaphragm being coaxial with respect to body 11, and a circular opening 34 is located at the center of the diaphragm. To form a movable continuation of the venturi, an annular diffuser 36 is disposed coaxially in diaphragm opening 34. Diffuser 36 has a hexagonal head 37 which fits against diaphragm 33 on the side remote from venturi nozzle 28 and has a cylindrical portion 38 extending through diaphragm opening 34 and occupying the remainder of the length of the diffuser. An annular shoulder 39 on the inner flat face of hexagonal head 37 accurately centers diffuser 36 in diaphragm 33. Diffuser 36 is provided with a conical axial bore 41 which tapers, at about six degrees for example. The bore 41 tapers inwardly from the end at hexagonal head 37 to an orifice 42 at the center of the end surface of the cylindrical portion 38 of the diffuser 36. This orifice 42 is made slightly larger, one sixty-fourth of an inch larger for example, than the orifice 32 on nozzle 28. The outer surface of cylindrical portion 38 is threaded for the application of hexagonal nut 43 to secure diffuser 36 to the diaphragm 33.

Orifice 42 of diffuser 36 is accurately centered with respect to diaphragm 33 so that the orifice is in line with orifice 32 of nozzle 28, preferably within about three thousandths of an inch in the case of a three thirty-seconds inch orifice, and the spacing between the nozzle and diffuser should be between about three-eighths and three-fourths of the diameter of the nozzle orifice.

It will be evident that with this split venturi arrangement fluid flowing therethrough will be at the lowest pressure at the narrowest point of the venturi which is at the split between the nozzle 28 and the diffuser 36. Pressure builds up again in going through diffuser 36 so that a low pressure exists on that side of the diaphragm 33 where the split in the venturi is located and a higher pressure exists on the other side of the diaphragm where the fluid has passed through the diffuser. Any misalignment beyond about three percent of orifice diameter in axial alignment of nozzle 28 and diffuser 36, and any spacing therebetween outside of about three eighths to three fourths of the diameter of orifice 32 may result in a significant loss of sensitivity due to the fluid jet from the nozzle not properly entering the orifice 42 of the diffuser. Such a condition will lessen the pressure differential between the two sides of diaphragm 33.

In order to hold diaphragm 33 in place against shoulder 26 of body 11 and to form the endwall of the body, a cylindrical head 44 is threadably engaged in bore 17 in a coaxial relationship with the principal body element 11. The outer end of head 44 is reduced by about three eights diameter in size to a hexagonal shape which is convenient for the application of a wrench in tightening into the body 11. A broad stepped bore 46 is provided in the inner end of head 44 with the larger diameter portion being near the end face of the head and forming a fairly narrow shoulder 47 which bears against the rim of diaphragm 33. This forms a leak proof seal which in this embodiment is all metal although the construction used is equally adaptable to the use of elastomer gaskets. The total depth of the stepped bore 46 may be preferably about two thirds of the axial length of head 44. An additional axial bore 48 extends from the end of bore 46 through head 44 and is threaded to connect with fluid discharge pipe 49.

A mechanical linkage 51 is provided to transmit the motion of diaphragm 33 to a switch exterio rto body 11. Linkage 51 consists of a rod 52 which is somewhat smaller than bore 23 in body 11 and of a length sufficient to reach through that bore from the upstream edge of nut 43 of diffuser 36 almost to the outer end of arm 16. A short distance from the upper end of rod 52 the rod is of reduced diameter to form a shoulder 53 for a relatively short length and the lower four fifths of the rod is of still smaller diameter. Near the lower end of rod 52 a transverse bore 54 therein is threaded to receive an adjustment screw 56. A washer 57 under the head of screw 56 and a compression spring 58 around the screw between the washer and rod 52 provides for holding the screw at a selected position. Within bore 23, a resilient tube 59 is disposed coaxially around all but the uppermost portion of rod 52, the tube being shrink fitted on shoulder 53 preferably with its outer surface conforming with the largest diameter portion of the rod. The length of tube 59 is such that when mounted on shoulder 53 the lower end extends almost to the adjustment screw 56. An annular connector 61 is threaded into the lower end of bore 23 to secure the linkage assembly 51 therein. Connector 61 consists of a tubular section 62 exteriorily threaded at each end and with a relatively narrow hexagonal section 63 between the threaded sections. The inner diameter of the connector 61 is slightly greater than the outer diameter of tube 59 except for a short portion of the lower end of the connector which fits tightly against the tube. A sleeve 64 which has an internal diameter to fit snugly over the outside of tube 59 is disposed coaxially therearound adjacent to the lower end of connector tubular section 62. An internally threaded cap nut 66 screws on the lower end of tubular section 62 pressing sleeve 64 therebetween and thus securing tube 59 in position and forming a fluid tight seal. The upper end of rod 52 is held in this manner against the face of diffuser nut 43 to sense movement of the diaphragm 33.

The described structure is arranged so that, with no fluid pressure on diaphragm 33, the central portion of the diaphragm is held away from the flat inner end surface of bore 17 by a small amount, for instance about 10 mils in this embodiment, by the pressure of rod 52 on nut 43. The mechanical linkage 51 thus functions as a spring cantilever.

A microswitch 67 is secured on arm 16 by means of screws 68 in such a manner that the switch control element 69 is in position to be actuated by the end of adjustment screw 56 upon a very slight lateral movement of rod 52. Microswitch 67 is provided with electrical terminals 71 which may be connected, for example, to a power supply 72 in series with a relay 73. Relay 73 may variously be adapted to operate controls, alarms, safety mechanisms or the like, such adaptations being apparent to those skilled in the art.

A box 74 providing a protective covering for microswitch 67, and the end of mechanical linkage 51, is secured to arm 16. A small opening 76 in box 74 provides means for bringing out electrical leads. An end of box 74 is open adjacent to electrical terminals 71 and a cover 77 is provided for this open end thus providing ready access to the electrical terminals.

The interlock unit is carefully calibrated on assembly to obtain the desired operating characteristics. The mechanical linkage 51 is installed in bore 23 prior to the installation of diaphragm 33. By then placing a straight edge across from one side of shoulder 26 to the other side the exact distance to rod 52 from the plane of diaphragm 33 when unstressed may be determined. By comparing this dimension with the thickness of nut 43 the approximate amount of displacement of diaphragm 33 and rod 52 may be determined. Should this displacement be insufficient, shims may be placed between the nut 43 and diaphragm 33, and if the displacement is excessive the nut may be reduced in thickness. After completion of the assembly, excepting the installation of box 74, the unit may be connected in a test fluid circuit where a flow of controlled input pressure may be applied to the interlock. As the flow of fluid is increased the back pressure on the side of diaphragm 33 which is downstream from the orifice increases, pressing the adjacent end of rod 52 and causing the end of the rod to move in a corresponding direction. The other end of rod 52 then moves slightly in the opposite direction or toward microswitch 67 the amount of movement being proportional to the back pressure on diaphragm 33. Screw 56 may then be adjusted to cause the switch 67 to close at the desired rate of fluid flow. However to obtain the desired range of operation, defined by the rate of flow at which the switch 67 will close and the drop in flow which must occur before it will open, requires a balance between the load placed on the diaphragm 33 by linkage 51 and the setting of the adjustment screw 56. After the proper setting of the adjustment screw 56 is obtained it may be sealed in place with glyptal or other hardenable material in order to prevent accidential movement since the desired setting is quite critical.

In operation the unit may be set, as described above, to operate switch 67 upon a normal fixed fluid flow and to release at a drop in the flow rate to about 90 to 95 percent of the normal flow.

Conditions may at times be such as to increase pressure in the input side of the interlock by as much as three or four times the normal pressure causing a proportional increase in flow through the orifice and in differential pressure on the diaphragm 33. Damage to the diaphragm 33 under these conditions is prevented by the fact that the end wall of bore 17 extends inwardly almost to nut 43. Therefore a fairly large pressure on the downstream side of diaphragm 33 will press the diaphragm against the bottom of bore 17 and will cause no deformation of the diaphragm. Deformation might occur under conditions of high input pressure in the event diaphragm 33 was not so protected.

Some silt and deposits may gather in the shallow space between diaphragm 33 and the bottom of bore 17 and for this reason the hereinbefore described annular groove 24, which connects with the bore 27, has been provided. In order to rinse out the space under diaphragm 33 it is merely necessary to open the drain line connected to bore 31, by removal of plug 30 for example, and fluid will flow through the space to the annular groove and out through bore 31 to the drain.

Although the invention has been disclosed with respect to a preferred embodiment it will be evident to those skilled in the art that many variations are possible within the spirit and scope of the invention. Therefore it is not intended to limit the invention except as defined by the following claims.

What is claimed is:

1. An interlock device for detecting changes in a fluid flow comprising, in combination, a hollow housing having an inlet and an outlet for said flow, a resiliently flexible diaphragm mounted in said housing transverse to the path of said flow between said inlet and outlet and dividing said housing into two chambers, a venturi tube diffuser element transpierced through said diaphragm in a central portion thereof and secured thereto, said diffuser having a flow passage with a first opening facing said outlet and a relatively smaller opening facing said inlet, a venturi tube nozzle secured in said housing between said inlet and said diffuser and carrying fluid from said inlet towards said passage of said diffuser, said nozzle having an outlet which is directed into said small opening of said diffuser and spaced a small distance therefrom to transmit the reduced pressure in said diffuser to the upstream side of said diaphragm whereby said diaphragm is caused to move counter to said flow upon an increase in the rate thereof, and means responsive to movement of said diaphragm for detecting said change in fluid flow.

2. A device for detecting changes in a fluid flow comprising, in combination, an annular housing having an inlet and an outlet at opposite ends, a resilient diaphragm disposed coaxially in said housing and dividing said housing into two chambers, an annular venturi diffuser element secured to said diaphragm and forming a flow passage therethrough which is of small diameter relative to said diaphragm, a venturi nozzle element mounted in said housing at said inlet and having an opening directing fluid into said diffuser passage, said nozzle opening having a diameter substantially similar to that of said diffuser passage and being spaced a small distance therefrom whereby pressure on the upstream side of said diaphragm is lower than the pressure on the downstream side thereof under flow conditions causing said diaphragm to move upstream, and a linkage transpierced through said housing for detecting said diaphragm movement.

3. Means for detecting a change in the rate of a fluid flow comprising, in combination, a body having a chamber therein with spaced apart fluid inlet and outlet openings, a flexible centrally apertured diaphragm secured within said chamber between said inlet and said outlet and dividing said chamber into two sub-chambers, a nozzle element disposed within said body at said inlet, said nozzle being directed towards the central aperture of said diaphragm and having a fluid passage which tapers to a small diameter at the end facing said diaphragm thereby forming a portion of a venturi tube, a diffuser element mounted on said diaphragm in said central aperture thereof and haing a first end spaced slightly from said nozzle element whereby the low pressure in said tube is communicated with the upstream side of said diaphragm to move said diaphragm counter to said fluid flow upon an increase thereof, said diffuser having a through passage aligned with that of said nozzle and which is of substantially similar diameter at said first end of said diffuser, said passage of said diffuser being of expanding diameter in a direction away from said first end thereof whereby said diffuser forms a second and physically separate portion of said venturi tube, and means responsive to movement of said diaphragm for detecting said change of fluid flow rate.

4. An interlock device for detecting small changes in a fluid flow comprising, in combination, a housing having an inlet and an outlet for said fluid flow, a resilient diaphragm mounted in said housing transverse to said fluid flow and dividing said vessel into an inlet compartment and an outlet compartment, the center of said diaphragm being transpierced by an opening, said diaphragm having an outer portion comprising the portion of said diaphragm which is radially outward from said central opening thereof, a venturi tube transversely split substantially at the point of minimum diameter thereof and having the nozzle section thereof secured in said inlet compartment to direct the fluid flow toward the center of said diaphragm, the diffuser section of said venturi being secured in transpiercing relationship to said diaphragm in said central opening thereof and being aligned coaxially with said nozzle and spaced a small distance axially therefrom whereby the low pressure of said venturi tube is transmitted to the upstream side of said diaphragm causing said diaphragm to move against said flow upon an increase therein, and a linkage transpierced through a wall of said housing and coupled to said diaphragm for sensing movement thereof.

5. An interlock device for detecting small changes in a fluid flow as described in claim 4 wherein said inlet compartment of housing is provided with an annular shoulder adjacent the outer portion of said diaphragm and parallel therewith to prevent flexing of said diaphragm into said inlet compartment whereby said diaphragm is protected against deformation by extra high pressures within said outlet compartment of said housing.

6. An interlock device for detecting small changes in a fluid flow as described in claim 5 wherein an annular channel is provided around said shoulder in coaxial relationship therewith and proximal to the rim of said diaphragm, and wherein a drain passage in said housing connects with said channel, and comprising the further combination of a closure for said drain passage which may be selectively removed whereby the confined space between said shoulder and said diaphragm may be flushed out to remove any material that is deposited therebetween.

References Cited by the Examiner
UNITED STATES PATENTS

| | | | |
|---|---|---|---|
| 2,538,785 | 1/1951 | Karig | 73—228 X |
| 2,672,889 | 3/1954 | Swanson | 340—239 X |
| 2,734,106 | 2/1956 | Riley et al. | 200—81.9 |

NEIL C. READ, *Primary Examiner.*

D. MYER, *Assistant Examiner.*